Aug. 10, 1926.
L. J. WOERNER
ROTARY ENGINE
Filed Nov. 22, 1922 · 2 Sheets-Sheet 1
1,595,278
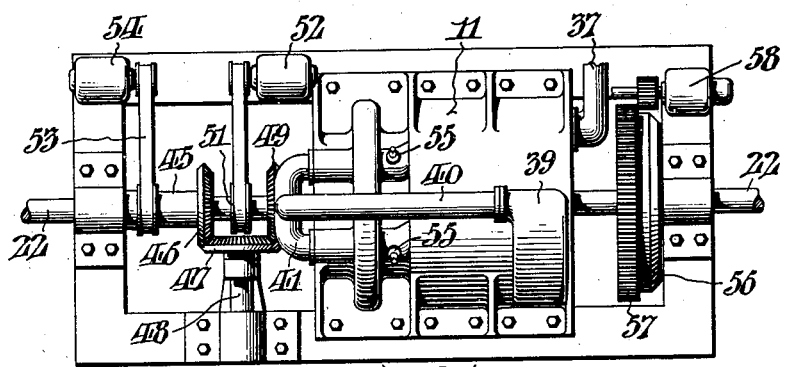
FIG. I.
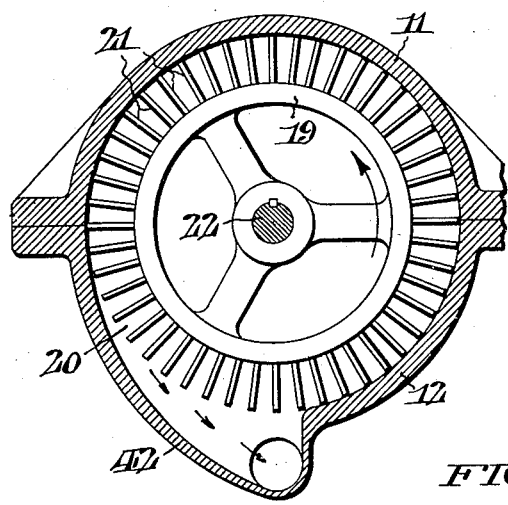
FIG. V.
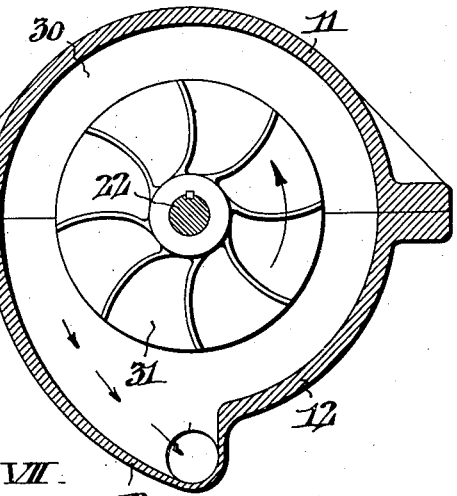
FIG. VI.
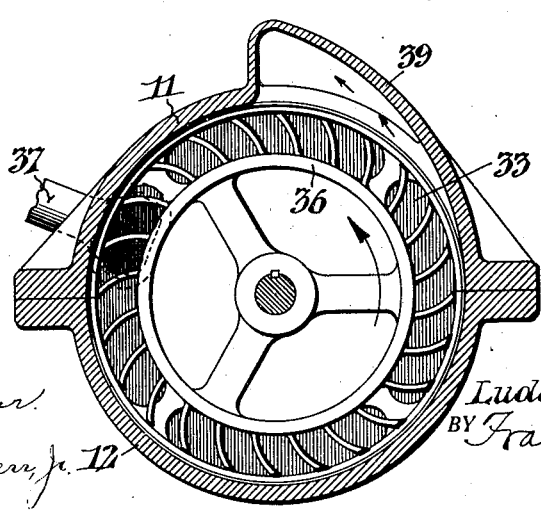
FIG. VII.
WITNESSES:
John C. Bergner
Thomas V. Kerr, Jr.
INVENTOR:
Ludwig J. Woerner,
BY Faley Paul
ATTORNEYS.

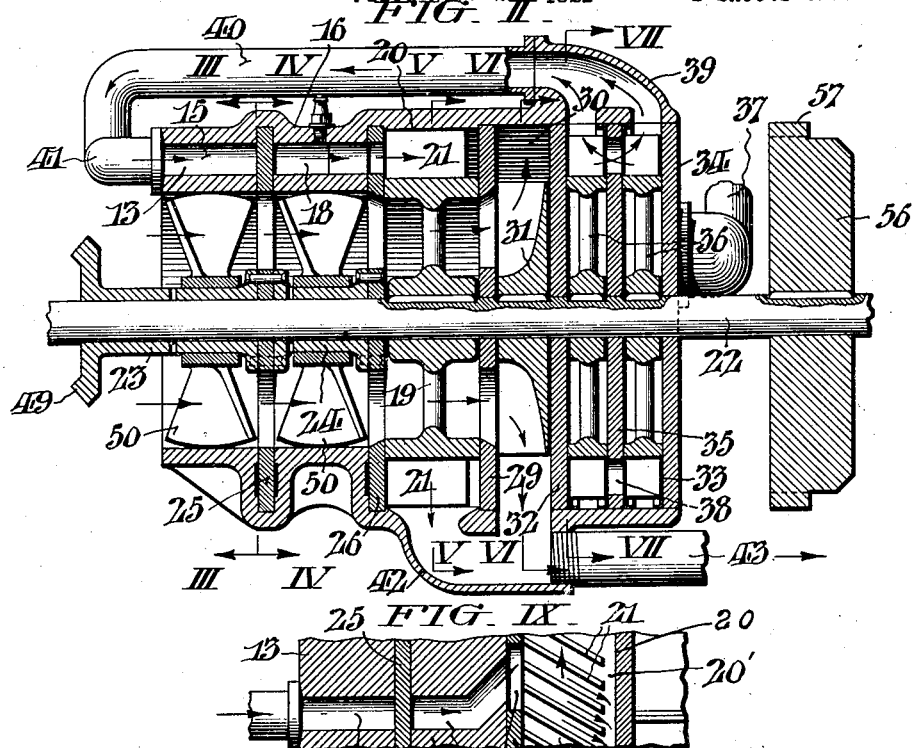
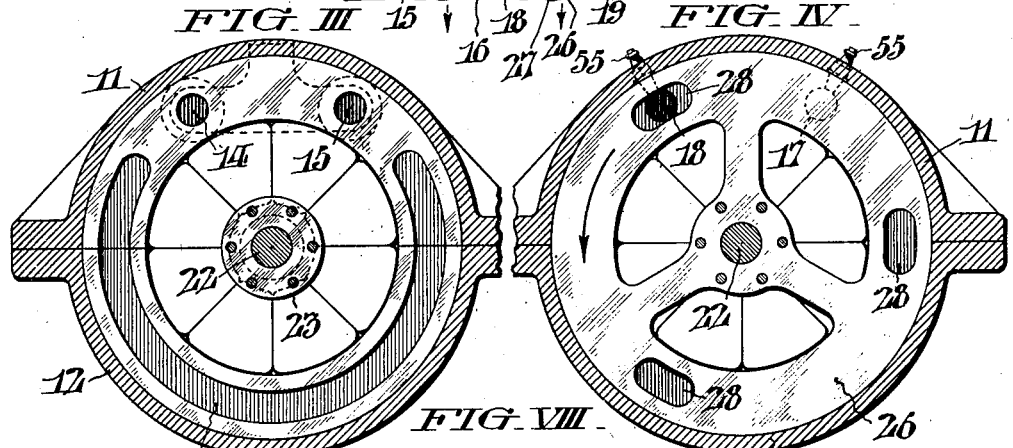
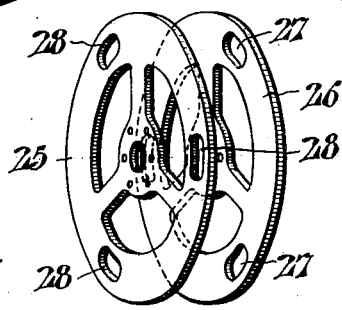

Patented Aug. 10, 1926.

1,595,278

UNITED STATES PATENT OFFICE.

LUDWIG J. WOERNER, OF WILLOW GROVE, PENNSYLVANIA.

ROTARY ENGINE.

Application filed November 22, 1922. Serial No. 602,536.

This invention relates to internal combustion turbine engines of the rotary type, and an object of said invention is to provide improvements in the structural details of such engines which embody a compressor for introducing the explosive charge into a combustion chamber at which point the charge is ignited, and a rotor for receiving the impact of the exploded gases, the improvements embracing among other things the arrangement of the several elements whereby the rotor is interposed between the compressor and explosion or combustion chamber with a suitable charge conducting means, so that the combustible gases and the exhaust gases enter and leave respectively at the same end of the engine.

In addition to the improvements described above the present invention contemplates the arrangement in a turbine engine, of the combustion chambers, rotors and other parts in the form of annular series defining an axial channel with means to flow cooling air through the channel to convey away heat of combustion from the engine, and maintain the temperature thereof at a normal working point.

Another object of the invention is to provide an air cooling means of the type above set forth in combination with an exhausting means for scavenging the rotor, by suction, of exhaust gases.

In addition to the foregoing this invention comprehends improvements in the details of construction and arrangement of the correlated parts to be hereinafter fully set forth and particularly pointed out by the appended claims.

In the accompanying drawings, Fig. I is a view in top plan of a gas turbine embodying my improvements.

Fig. II is a view in longitudinal section of the essential parts of the turbine engine illustrating the same on an enlarged scale.

Figs. III, IV, V, VI and VII are views in transverse section taken on the lines III—III, IV—IV, V—V, VI—VI, and VII—VII respectively of Fig. II.

Fig. VIII is a view in perspective of two valve disks forming part of the turbine engine and illustrating the same in operative relation; and Fig. IX is a diagrammatic view on an enlarged scale showing a development of the rotor and correlated parts to illustrate more clearly the path of the gases.

With reference to Figs. I and II, showing general assembly views of the gas turbine engine, 10 indicates a frame of any type found suitable for the support of the parts of the turbine engine, and 11 and 12 indicate respectively the upper and lower halves of a two-part casing subdivided internally to define the several working sections or compartments. The inlet section is indicated at 13 at the left-hand end of the turbine engine with respect to Fig. II, said section of the casing being provided with a pair of inlet ports 14 and 15 angularly spaced to a distance of preferably 60°. Adjacent the section 13 is the combustion section 16 having combustion chambers 17 and 18 in alignment with the intake ports 14 and 15 respectively.

The combustion chambers 17, 18, it will be observed from Figure IX—in which they are shown in detail—are straight or axial for a portion of their length and are then deflected laterally or circumferentially in the intended direction of rotation of the rotor which is indicated at 19 as located in the expansion chamber or rotor section 20, adjacent the section 16, and consisting of a spoked wheel having a series of peripheral blades 21 arranged spirally so as to be effectively acted upon by the impact of the gases to cause rapid rotation of the rotor 19. The deflected portions of the combustion chambers 17, 18, thus constitute in effect nozzles to direct the gases against the rotor blades.

The rotor 19 is keyed to a shaft 22 extending centrally and longitudinally through the casing, and said shaft loosely supports a pair of sleeves 23 and 24 located within the sections 13 and 16 respectively, said sleeves being flanged so that an intake valve disk 25 may be interposed therebetween and secured to the sleeves for rotation as a unit. A second valve disk 36 is provided and fixed to the end of the sleeve 24 for operation between the sections 16 and 20 to constitute a control for the combustion chambers 17, 18 against the discharge of gases therefrom. This control is effected by the provision of circumferentially elongated openings 27 provided in the disk 26 to extend transversely therethrough, and in a similar manner the disk 25 is provided with circumferentially elongated openings 28 controlling communication between the combustion chambers 17, 18 and inlet ports 14 and 15.

The interior of the casing is subdivided by means of a septum 29 located to the right of the rotor 19 to isolate the rotor section 20 from an annular fan cavity 30 in which is a fan 31 having lateral blades and a disk-like wall at one end for deflecting the cooling air and causing the same to discharge outwardly. The fan chamber 30 is divided at its right-hand side by means of a septum 32 defining a charge compressing chamber 33 between the septum 32 and the right-hand end wall 34 of the casing. The chamber 33 is subdivided by the provision of a wall 35 defining two chambers in each of which a compressing rotor or fan 36 is located and fixedly mounted upon the shaft 22.

The combustible gases are led into the side of the chamber 33 by means of an opening provided in the end wall 34 and a conducting pipe 37 in registration therewith, the dividing wall 35 being provided with openings 38 to permit the passage of the gases into both parts of the compressor chamber 33. The side wall of the aforesaid part 11 of the turbine casing is provided with an opening communicating with the chamber 33 which is closed in by a semi-crescent casing 39 having connection established by a pipe 40 with a manifold 41 provided with branches extending to the inlet ports 14 and 15.

The lower part 12 of the turbine casing is provided with a similar section chamber 42 to receive the exhaust from the rotor 19 at a peripheral point, said chamber 42 communicating also with the fan chamber 30 and discharging through a pipe 43. The valve disks 25 and 26 are a smooth working fit with the cooperating faces of the latter sections 13 and 16, the faces of the latter being formed with interrupted circumferential grooves 44 the function of which is to reduce the amount of rubbing surface between the moving parts and incidentally providing cavities for the accumulation of lubricant, which finds its way therein by means of oil grooves appropriately provided throughout the structure to lead the oil to the working parts wherever required.

The shaft 22 carries exteriorly of the casing a freely mounted sleeve 45 formed with a bevel gear 46 which meshes with a bevel gear 47 freely rotatable upon a stub shaft 48 suitably journaled in the frame. The bevel gear 47, in turn, meshes with a bevel gear 49 formed with or secured upon the sleeve 23, so that said sleeve and associated parts including the valve disks 25 and 26 may be rotated by the shaft 22 and in a direction reversed with respect thereto. The sleeves 23 and 24 carry fans 50 for the purpose of inducing a flow of cooling air axially through the casing, the disks 25 and 26 and the rotor 19 being spoked or perforated to permit of such flow.

The shaft 22 may be supplied with a pulley 51 for driving, in any manner found suitable or convenient, the generator 52; while the sleeve 45 may be provided with a similar driving arrangement 53 to operate the magneto 54 for supplying high tension current to the ignition system in which is included the spark plugs 55 located in radial openings formed in the casing and communicating with the combustion chambers 17 and 18. The fly-wheel, indicated at 56, is mounted upon the shaft, and for the sake of convenience an annular series of gear teeth 57 may be formed therewith as part of a driving connection to a starting motor indicated at 58.

In the operation of the machine, in view of the detailed description given above, the combustible gases are drawn from the carburetter (not shown) through the pipe 37 from into the compression chamber 33 from which they are discharged by rapid rotation of the rotors or fans 36 under the influence of the shaft 22, through the conduit 40, manifold 41, and into the inlet ports 14 and 15.

The openings 28, of which three are provided in the dsk 25, are successively brought during rotation opposite the ports 14 and 15, and as the latter are uncovered a charge of combustible vapor is forced into the communicating combustion chambers 17 and 18.

A suitable timing mechanism is to be provided to energize the spark plugs 55 successively or alternately to ignite the charges of combustible vapor compressed within the combustion chambers 17, 18, and at the proper intervals the openings 27, of which three are provided in the disk 26, are brought opposite or in registration with the outlets or nozzles formed by the deflection of said combustion chambers, so that the expanding gases may be permitted to discharge through said openings 27 against the blades 21 of the rotor 19, causing rotation of the latter which is transmitted to the shaft 22. The spent gases exhaust into an annular space 20'—Figs. II and IX— in the chamber 20 formed by the reduction in width of the blades 21, which chamber communicates with the exhaust chamber 42. During rotation of the shaft 22 the fans 50 induce a flow of air axially through the turbine casing, the velocity of which flow is amplified by the fan 31 which acts also to direct said flow of air radially and to force the air into the chamber 42 and out through the pipe 43, inducing a partial vacuum in the rotor chamber 20 which will act to scavenge, by suction, the exhaust gases therefrom, and prevent the building up of back pressure within the rotor chamber.

This case is a continuation in part of my prior but now abandoned application for the same invention filed August 8, 1921, bearing Serial No. 490,438.

Having thus described my invention, I claim:

1. A gas turbine-engine comprising a casing subdivided to provide, inlet ports with combustion passages aligned therewith, expansion, fan and compression chambers; a conduit connecting the compression chamber and inlet passages, a rotor in the expansion chamber having blades of less width than said chamber to provide an annular space communicating with the engine exhaust, and a laterally vaned fan having a disk-like deflecting portion whereby the spent gases are caused to leave the engine under suction at the same end as the combustible gases enter.

2. A gas turbine-engine comprising a casing subdivided to provide, inlet ports with combustion passages aligned therewith, expansion, fan and compression chambers; said last mentioned chamber being partitioned to house compression rotors in parallel, means connecting the compression chamber and inlet passages, a rotor in the expansion chamber having blades of less width than said chamber to provide an annular space communicating with the engine exhaust, a valve disk controlling the entry of combustible gases from the compression chamber to the combustion passages, and a second valve disk controlling the outlet from said passages to permit the building up of pressure therein.

3. A gas turbine-engine comprising a casing subdivided to provide, angularly spaced inlet ports with combustion passages aligned therewith, expansion, fan and compression chambers; said last mentioned chamber being divided to house compression rotors in parallel, means connecting the compression chamber and inlet passages, a rotor in the expansion chamber, an apertured disk rotatable to control entry of combustible vapor to the spaced inlet passages, and a second rotary apertured disk controlling the discharge of exploded gases therefrom into the expansion chamber.

4. A gas turbine-engine comprising a casing subdivided to provide, angularly spaced inlet ports with combustion passages aligned therewith, expansion, fan and compression chambers; said last mentioned chamber being divided to house compression rotors in parallel, means connecting the compression chamber and inlet passages, a rotor in the expansion chamber and a supporting shaft therefor, disk valves loosely mounted on said shaft for controlling entry of vapor to the combustion passages and discharge of exploded gases therefrom, and mechanism effective to rotate said valves and shaft in reversed relation.

5. A gas turbine-engine comprising a casing subdivided to provide, angularly spaced inlet ports with combustion passages aligned therewith, expansion, fan and compression chambers; said last mentioned chamber being adapted to house compression rotors in parallel, means connecting the compression chamber and inlet passages, an axial shaft, a rotor within the combustion chamber carried by said shaft, a sleeve loosely mounted upon the shaft, disk valves carried by the sleeve operative to control the inlet of combustible vapor into the combustion passages and outflow of exploded gases therefrom, a gear carried by said sleeve, a gear fixed to the shaft, and an idler gear meshing with the aforesaid gears to rotate the sleeve reversely with respect to the direction of shaft rotation.

6. A gas turbine-engine comprising a casing subdivided to provide, spaced inlet ports with combustion passages aligned therewith, expansion, fan and compression chambers; said last mentioned chamber being adapted to house compression rotors in parallel, a conduit having a flared connection with the combustion chamber for establishing communication into the inlet passages, a rotor in the expansion chamber having blades of less width than said chamber to provide an annular space communicating with the turbine exhaust outlet, a rotary disk valve having openings controlling the entry of combustible gases from the compression chamber to the combustion passages, and a second rotary disk valve having relatively staggered openings controlling the outlet from said passages to permit building up of pressure therein.

7. A gas turbine-engine comprising a casing subdivided to provide angularly spaced inlet ports with combustion passages aligned therewith, expansion, fan and compression chambers; said last mentioned chamber being adapted to house compression rotors in parallel, a conduit having a flared connection with the combustion chamber for establishing communication into the inlet passages, a rotor in the expansion chamber having blades of less width than said chamber to provide an annular space communicating into a flared exhaust outlet, a disk valve having openings controlling the entry of combustible vapor from the compression chamber to the combustion passages, and a second rotary disk valve having relatively staggered openings controlling the outlet from said passages to permit building up of pressure therein.

8. A gas turbine-engine comprising a casing subdivided to provide angularly spaced inlet ports with combustion passages aligned therewith, expansion, fan and compression chambers; said last mentioned chamber being partitioned to house compression rotors in parallel, means connecting the compression chamber and inlet passages, a rotor in the expansion chamber having blades of less width than said chamber to provide an annular space communicating with the engine exhaust outlet, a rotary disk valve having openings controlling the entry of combustible vapor from the compression chamber into the combustion passages, a second rotary disk valve having relatively staggered openings controlling the outlet from said passages to permit building up of pressure therein, and a fan in the fan chamber for inducing a flow of air axially through the engine and rotor to conduct away the heat of combustion and exhaust the spent gases under suction.

9. A gas turbine-engine comprising a casing subdivided to provide, spaced inlet ports with combustion passages aligned therewith, expansion, fan and compression chambers; said last mentioned chamber being adapted to house compression rotors in parallel, the aforesaid combustion passages being angularly deflected in the direction of engine rotation, means connecting the compression chamber and inlet passages, a rotor in the expansion chamber having blades of less width than said chamber to provide an annular space communicating with an exhaust outlet at the inlet end of the engine, and relatively apertured disk valves respectively controlling the inlet of combustible vapor to the combustion passages and discharge of the exploded charges therefrom into the expansion chamber.

In testimony whereof, I have hereunto signed my name at Philadelphia, Pennsylvania, this 17th day of November, 1922.

LUDWIG J. WOERNER.